UNITED STATES PATENT OFFICE.

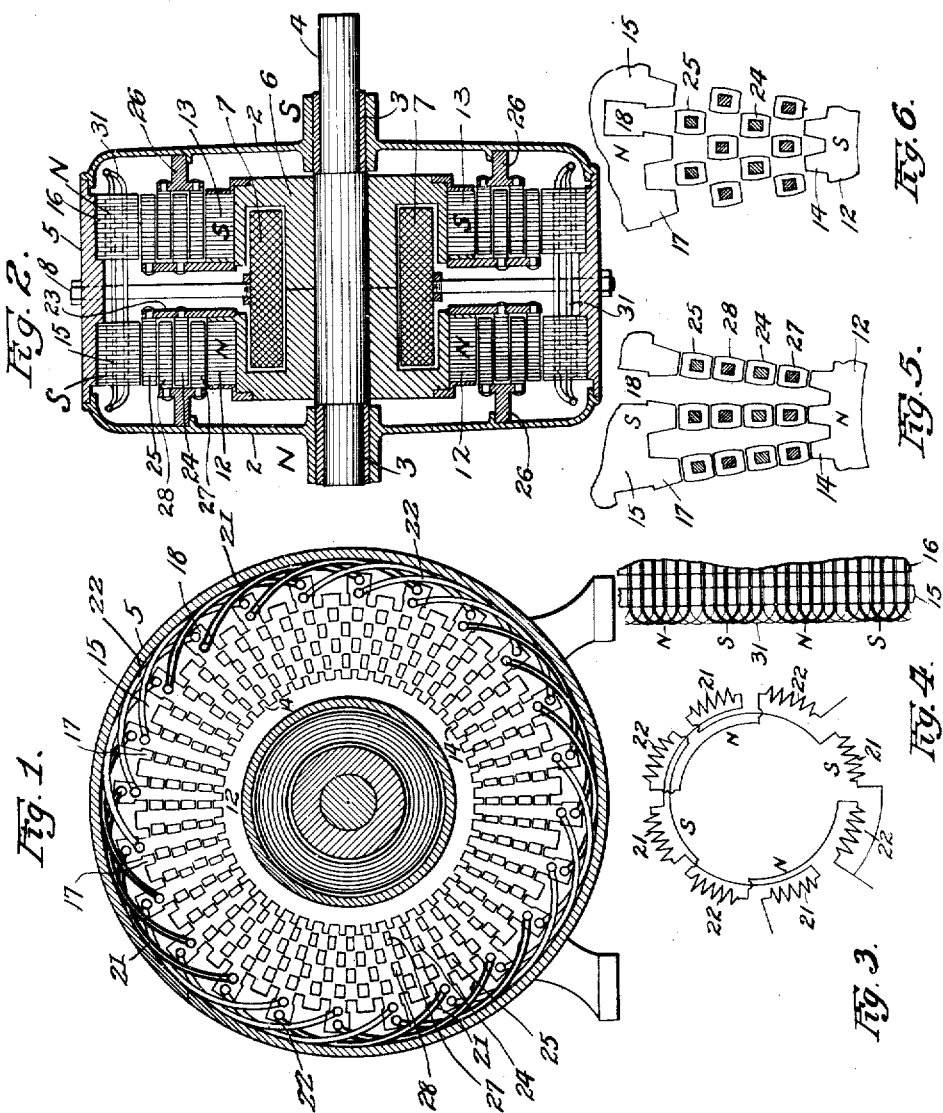

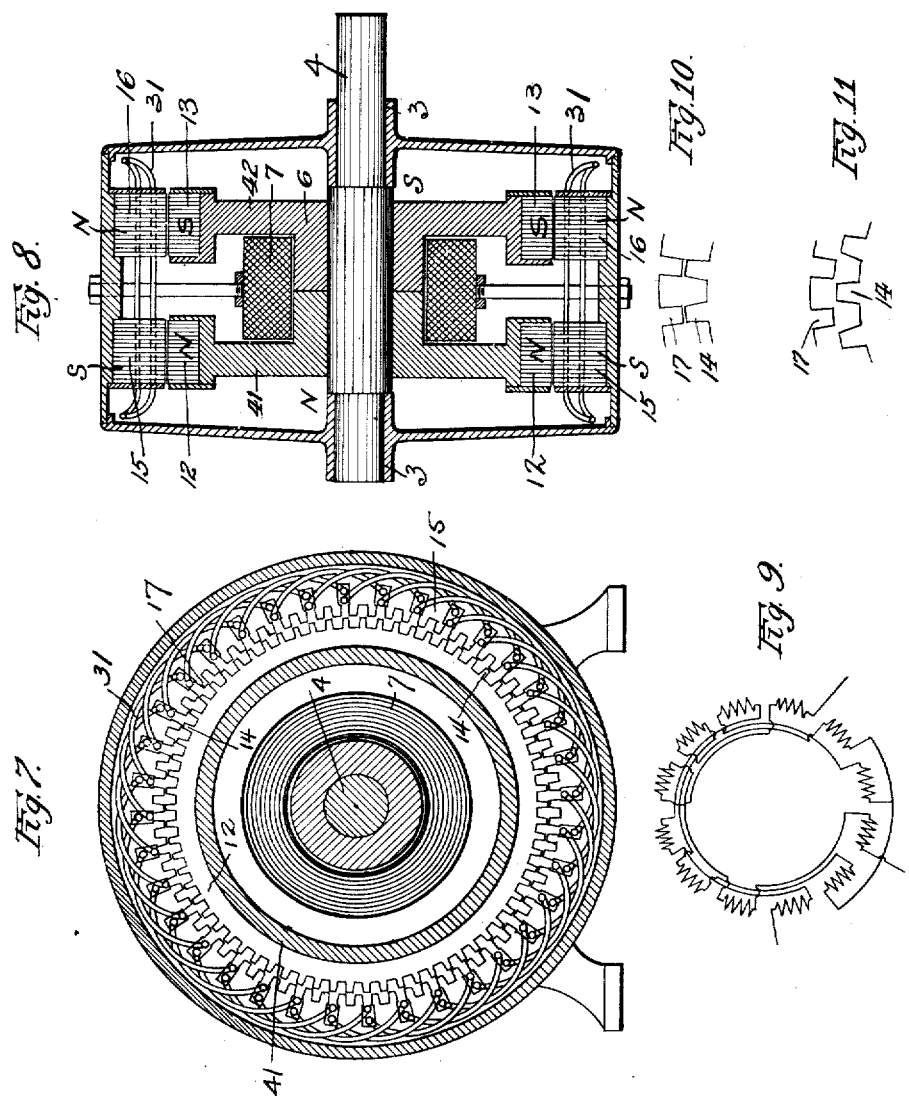

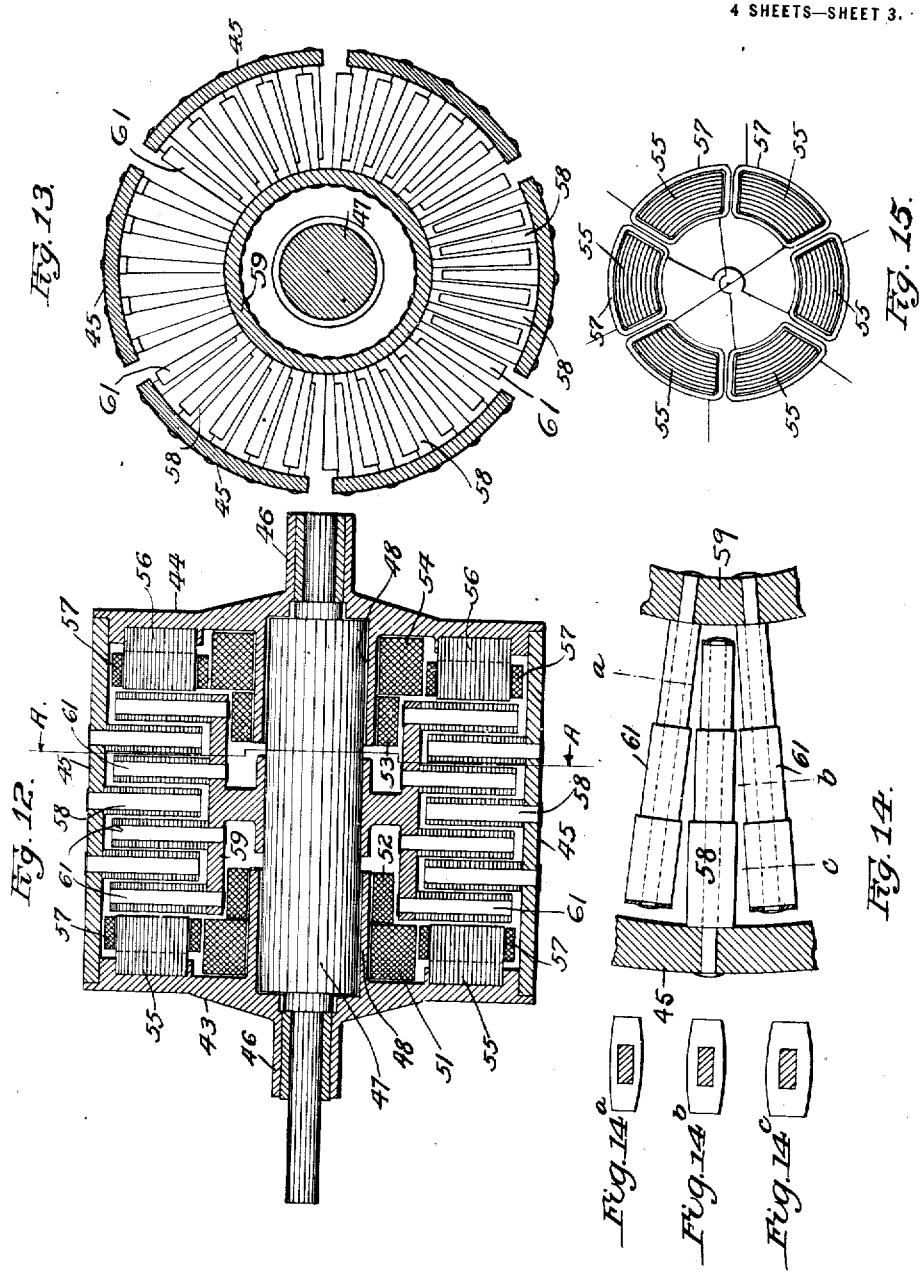

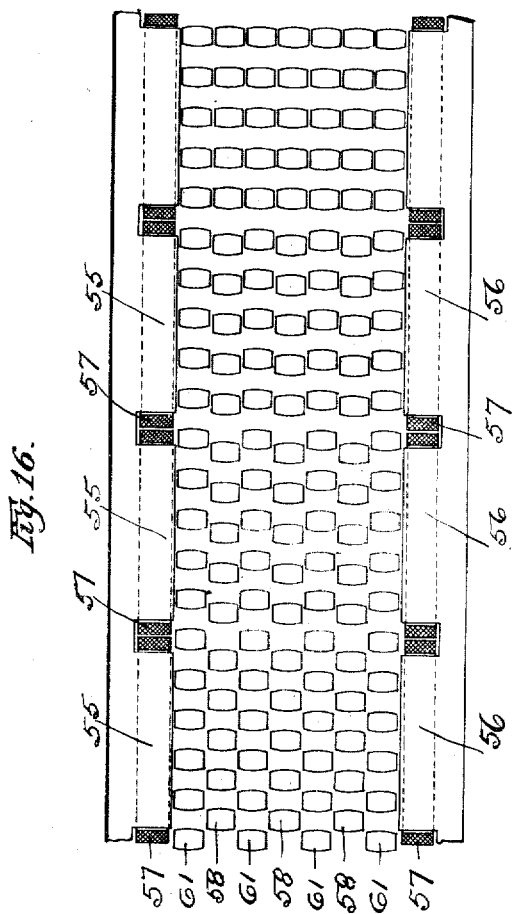

ALFONS H. NEULAND, OF SAN FRANCISCO, CALIFORNIA, ASSIGNOR TO NEULAND ELECTRICAL COMPANY, INC., A CORPORATION OF NEW YORK.

DYNAMO-ELECTRIC MACHINE.

1,211,617. Specification of Letters Patent. Patented Jan. 9, 1917.

Application filed August 27, 1913. Serial No. 786,907.

*To all whom it may concern:*

Be it known that I, ALFONS H. NEULAND, a subject of the Czar of Russia, and a resident of the city and county of San Francisco, State of California, have invented certain new and useful Improvements in Dynamo-Electric Machines, of which the following is a specification.

The invention relates to dynamo electric machines, and particularly to alternating current dynamo electric machines.

The object of the invention is to provide a dynamo electric machine which possesses a very large power capacity in proportion to its size.

Another object of the invention is to produce in a dynamo electric machine, a revolving and alternating magnetic field which revolves at a much greater velocity than that of the revolving element which produces it.

The invention possesses other advantageous features which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description, as I may adopt many variations within the scope of my invention as expressed in said claims.

In a construction in which the adjacent surfaces of the stator and inductor are provided with teeth or projections, producing a single air gap between the rotating and stationary parts, the maximum current which it is possible to generate is dependent partly upon the maximum possible magnetomotive force, created by the exciting current, which will force the magnetic flux through the alined teeth, bars or projections and the induced windings associated with said alined teeth, bars or projections without causing an excessive flux through the induced windings associated with or opposing the staggered teeth, bars or projections, which will hereinafter be termed the opposed flux. The opposed flux at the point at which the teeth are staggered is also increased by the current in the induced windings associated with the staggered teeth, which current creates a magneto motive force which combines with that due to the exciting current and increases the opposed flux through the non-alined teeth in proportion to the load current.

My present invention contemplates the substantial reduction of this opposed flux due to the load current, by greatly increasing the magnetic resistance at that point at which the teeth, bars or projections are staggered. This is accomplished by a plurality of series of laminated stationary and rotating bars or teeth which successively move into and out of alinement, producing in their two extremes of position closed and open magnetic circuits. This arrangement permits of the employment of a strong exciting current, creating a powerful magneto motive force and a powerful generated current in the induced windings, thereby considerably increasing the power of the machine.

The present invention also involves the production of a revolving alternating magnetic field having an angular velocity many times greater than the revolving element which produces it, causing a rapidly alternating flux through the windings of the induced circuit, thereby producing in combination with the multiple air gap feature a machine of great power capacity.

The peculiar principle of the machine enables the production of a true sinusoidal flux cutting the windings of the stator and the shape of the wave may be further controlled by the distribution or congregation of the coils on the stator belonging to each phase. The same structure may be wound for any number of phases and in the drawings I have shown both two phase and three phase windings.

Referring to said drawings: Figure 1 is a cross section, partly diagrammatic, of one form of the machine of my invention. Fig. 2 is a longitudinal section of the machine shown in Fig. 1. Fig. 3 is a diagrammatic representation of the induced windings of the machine. Fig. 4 is a fragmentary development on a flat surface of the induced windings. Fig. 5 is a detail indicating the position of the parts of the magnetic circuit when the circuit is closed. Fig. 6 is a similar detail showing the position of the parts when the magnetic circuit is open. Fig. 7 is a cross section of a modified form of construction employing only one air gap in the magnetic circuit. Fig. 8 is a longitudinal section of the machine shown in Fig. 7. Fig. 9 is a diagrammatic representation of the induced windings of the machine shown in Fig. 7. Fig. 10 is a detail showing the position of the teeth on the stationary and rotating elements when the magnetic circuit is closed. Fig. 11 is a similar detail showing the position of the teeth when the magnetic circuit is open. Fig. 12 is a longitudinal section of a modified form of machine employing the multiple air gap construction. Fig. 13 is a cross section of the machine shown in Fig. 12 taken on the line A—A. Fig. 14 is a detail of the multiple air gap construction. Figs. 14ᵃ—14ᵇ—14ᶜ are cross sections of one of the arms shown in Fig. 14 taken on the lines $a$—$b$ and $c$ respectively. Fig. 15 is a view on a smaller scale of the coils of the induced winding of the machine shown in Fig. 12. Fig. 16 is a development on a flat surface of part of the magnetic circuit of the machine.

The machine of my invention may be employed either as a motor or a generator, but for the purpose of description herein, I shall describe its operation as a generator.

The windings of this machine may be connected so as to produce either single or polyphase currents; a two phase winding and a three phase winding being shown in the drawings.

The machine illustrated in Figs. 1 to 6 inclusive comprises generally a stationary housing composed of the side plates 2 which provide bearings 3 for the shaft 4 and the frame 5. Mounted on the shaft 4 and secured thereto is an iron core 6 which provides a conductor for the magnetic flux. Surrounding the iron core and spaced apart slightly therefrom is the coil 7 of the magnetizing winding, which is stationary and is supported from the frame 5 by any suitable means, such as the bolts or rods 8. The magnetizing winding 7 is energized by a direct current from a suitable source, producing a north pole on one side of core 6 and a south pole on the other side. Secured to the opposite sides of the core 6 are the laminated elements 12—13 which form part of the magnetic circuit. These elements 12—13 are preferably, though not necessarily, provided on their peripheries with equally spaced teeth 14.

Secured to the frame 5 in alinement with and spaced from the rotating elements 12—13 are the stator elements 15—16 which are also preferably laminated and provided with equally spaced teeth or projections 17. The number of teeth on a stationary element differs from the number on a rotating element as will be hereinafter set forth. The stator elements are provided with slots 18 in which are arranged the windings of the induced circuit. The present machine is provided with a two phase winding, each phase comprising four groups of coils, the successive groups in each phase being wound in opposition. The coils belonging to the groups of the two phases are arranged so that they overlap as shown in Fig. 4, in which the dark lines represent the coils of one phase and the light lines the coils of the other phase. The present construction presents a four pole machine, the like poles lying diametrically opposite each other and the groups belonging to the same phase being arranged in quadrature as shown in Fig. 3. The groups 21 belong to one phase and the groups 22 belong to the other phase, the successive groups in each phase being reversed with respect to each other to produce successive north and south poles.

Arranged between the rotating and stationary elements 12—13 and 15—16 are a plurality of magnetic circuit segments which operate to close the magnetic circuit in some parts or portions of the machine and to thoroughly open it in other parts or portions. Secured to the rotating elements 12—13 by means of a plate 23 of brass or other non-magnetic material, are one or more series of laminated or partly laminated bars or teeth 24—25, the corresponding bars in each series being radially alined with each other and with the teeth on the rotating part to which they are attached. The two series of bars are spaced apart radially, each series completing a circle of regularly spaced bars. Secured to the stationary part of the machine by means of brackets 26 of non-magnetic material are one or more series of laminated or partly laminated bars or teeth 27—28 arranged between and adjacent the series of bars 24—25. The stationary bars 27—28 are alined with the teeth on the stationary element, the bars in the two series being spaced apart radially. Between the teeth on the stationary elements 15 and the rotating element 12 there are, therefore, four series or circles of bars, the bars of two of the series being stationary and alined with the teeth on the stationary element and the bars of the other two series being movable and alined with the teeth on the rotating part. Adjacent the teeth of the rotating part is a series of stationary bars, then occurs a series of rotating bars, then a series of stationary bars, then a series of rotating bars and then the teeth of the stationary element. The bars of the various series lie close together radially, so that when a portion of the bars of all of the series are alined, a circuit for the magnetic flux is established. The width which constitutes the active surface of each bar and of each tooth is slightly less than one-half the pitch of the bars or teeth so that when the teeth and bars are staggered or non-alined, a thorough interruption of the magnetic circuit is obtained. On account of the different diameters of the circles of the various series of teeth and bars, it is evident that the teeth or bars in the outer series are somewhat wider than the teeth or bars in the inner series.

The number of teeth or bars in the stationary series and in the revolving series depend upon the speed of the machine, the desired frequency and the number of pole windings desired. In the present machine there are 48 teeth or bars in each stationary series and 50 teeth or bars in each rotating series producing a four pole machine, two of the poles occurring on one member and two on the other member. A difference of two teeth produces a four pole machine, a difference of three teeth a six pole machine, a difference of four teeth an eight pole machine, and so on. In the construction illustrated it will be noted that the teeth are alined in two diametrically opposite portions and staggered or non-alined at two portions half way between the alined portions.

The various teeth occurring on one side of the machine, that is, the positive pole side N, are so arranged in a four pole machine that the planes of alinement of the teeth on the opposite side, the negative pole side S, occur midway or 90 degrees in advance of the planes of alinement of the teeth or bars on the positive pole side. For example, in Fig. 2, assuming that the teeth on the left side of the machine are alined in the plane of the section, the teeth on the right side will be alined in a plane at right angles to the section. This produces two positive rotating poles on one side of the machine and two negative rotating poles on the other side of the machine, the poles being in quadrature.

The coils of the winding 21—22 composing the induced circuit pass through the slots in both stationary elements 15—16, thereby subjecting the windings to the effect of the four rotating poles, the north and south poles successively cutting the coils. It will be noted from Fig. 1 that for a movement of the rotating elements a distance of one half a tooth pitch that the plane of alinement of the teeth moves through an arc of 90 degrees, or performs a complete revolution for the movement of the teeth a distance of twice the tooth pitch. Since there are 50 teeth in each of the rotating series, a complete revolution of the rotating element will cause twenty-five revolutions of the plane of alinement of the teeth. Since the alinement of the teeth closes the magnetic circuit and allows the flux to pass through the windings at the portion of alinement, it is evident that in a four pole machine having 50 teeth on the rotating element, there are 100 reversals of the flux through the windings for each revolution of the rotating part. These rapid reversals of the flux through the induced coils generate an extermely high electro motive force per turn therein with a consequent high power output. The plane of alinement of the teeth or bars progresses from tooth to tooth on the stationary element as the rotatable element revolves, or gradually and evenly around the stationary element, and since the successive poles are of opposite sign, the induced windings on the stator are subjected to a rotating alternating field. The progression of the field through the windings is steady and gradual, producing the high power output without any material vibration of the parts. The direction of rotation of the high velocity field may be the same as that of the inductor or rotating part, or it may be in the opposite direction. In a four pole machine two more projections on the rotatable element than on the stationary element will cause rotation in the same direction and two less projections on the rotatable element than on the stationary element will cause rotation in the opposite direction. The same relation holds true in regard to the difference of three projections in the six pole machine, and so on.

In the drawings I have shown the coils of the induced windings arranged in each alternate slot which is made deeper to accommodate them, but it is to be understood that the windings may be placed in the successive slots, the alternate slots, the third slots and so on, depending upon the manner in which it is desired to arrange or distribute the windings. The teeth 14 on the rotatable element and the teeth 17 on the stationary element may be omitted and the surfaces of these elements made smooth when desired, allowing the bars in the various series to open and close the magnetic circuit. Other things remaining the same, this change will reduce the power capacity of the machine by reducing the active generating mechanism and the resistance of the magnetic circuit at the plane or planes in which the teeth are staggered.

I will assume that the magnetizing winding is arranged to produce a north pole N at the left side of the rotor and a south pole S at the right side of the rotor. This causes the stationary element 15 to be of south polarity as indicated by S and the stationary element 16 to be of north polarity as indicated by N. When the various teeth of the left side of the machine are in the position indicated in Fig. 1, the teeth on the right side are in the same relative position and 90 degrees in advance. In this position one half of the total magnetic flux passes through each of the alined groups of teeth or alined portions on the left side, through the stationary elements and frame and back through the alined groups of teeth or alined portions on the right side. The groups of coils in each phase are arranged in mechanical quadrature, and the successive groups connected in opposite directions; the fluxes which cut the coils are also in mechanical quadrature and of opposite polarity. On account of the high resistance of the magnetic circuit, at those portions where the teeth are non-alined, a very strong magnetizing current may be used, producing a powerful flux and permitting a large current to circulate in the induced windings. This powerful flux in combination with a field revolving, as in this case, twenty-five times as fast as the rotatable element, produces a machine of very high power capacity in proportion to its size. Either of these features alone will produce a machine having a greater power capacity in proportion to its size than standard machines now on the market.

The construction illustrated in Figs. 7 and 11 inclusive employs the same general features of the prior embodiment, with the exception that the multiple air gap feature is eliminated. The shaft reinforcing, or the core 6, is provided with radially flanged portions 41—42, occurring on opposite sides of the magnetizing winding, on which are arranged the toothed plates forming the rotatable elements 12 and 13. The toothed laminations 15—16 are secured to the frame and are arranged in juxtaposition with the rotatable elements. The teeth on the inductors and stationary elements are arranged in the same relation as in the prior embodiment, with the exception that there are two less teeth on each rotatable element than there are on each stationary element, producing a four pole machine in which the high speed revolving field rotates in the opposite direction to the rotatable element. The induced windings 31 are arranged as shown in Fig. 9, producing a three phase current. The windings are substantially the general three phase winding, with the exception that the coils encircle both stationary cores. In the present arrangement there are four coils per pole and phase. In this particular embodiment there are 72 teeth on each stationary element and 70 teeth on each rotatable element, producing thirty-five revolutions of the field for each complete revolution of the rotatable element. This relatively high velocity field, taken in connection with a high velocity rotatable element, produces a machine having a power capacity limited only by the magnetic resistance of the air gap between the teeth, when the teeth are staggered.

The teeth are made slightly narrower than one half the tooth pitch to increase the air gap between the staggered teeth. The teeth on the two sides of the machine are arranged so that the plane of alinement of the teeth on one side lies at a right angle to the plane of alinement of the teeth on the other sides, thereby producing four poles in quadrature, the successive poles being of opposite sign.

The modification shown in Figs. 12 to 16 inclusive employs the multiple air gap feature arranged longitudinally. The machine consists of a frame composed of the side plates 43—44 formed of magnetic material, and the connecting sectors 45 of brass or other non-magnetic material. The side plates 43—44 are provided with bushings 46 in which are arranged the bearings of the shaft 47 and with inwardly extending bushings 48 surrounding the magnetically reinforced shaft, upon which the coils 51—52—53—54 of the magnetizing winding are arranged. The magnetizing winding is arranged in four coils for the purposes of convenience and arrangement, the number of coils being immaterial. The shaft 47 acts as a conductor for the total magnetic flux and is reinforced or made large in diameter for that purpose.

Arranged on each of the end plates 43—44 are the pole-pieces 55—56, the number and relative position of pole-pieces depending upon the construction of the machine and the current to be generated. In the present construction, there are six pole-pieces 55 on side plate 43 and six pole-pieces 56 on side plate 44. The pole-pieces 55—56 are alined in pairs in the direction of the axis of the machine, and the pole-pieces on each plate are spaced apart circumferentially. Arranged on the pole-pieces are the coils 57 of the induced winding. The present embodiment being a three phase arrangement, the coils on each side of the machine are connected in pairs, the diametrically opposite coils constituting one pair, and the turns in one coil are reversed with relation to the other in each pair.

Arranged between the pole-pieces of the machine, are a plurality of radially extending laminated bars or teeth which are movable with respect to each other to completely open and close the magnetic circuit between the pole-pieces. Secured to each sector 45, are a plurality of stationary bars or teeth 58 arranged in one or more circumferential series. The bars in each series are spaced apart circumferentially at an even pitch, and the various series are spaced apart longitudinally. In the present construction there are three series of five bars each arranged on each sector 45. The position of the bars on one sector with relation to those on the other sector will be set forth hereinafter.

Secured to the shaft 47 is a non-magnetic spider 59 to which are secured a plurality of radially extending laminated bars 61 arranged in one or more circumferential series. The bars 61 lie intermediate the pole-pieces and the fixed bars, and by their varying positions operate to open and close the magnetic circuit through the respective pairs of pole-pieces. In the present construction there are four circumferential series of bars 61 and there are thirty-one bars in each series. The pitch of the bars in each series is the same as the pitch of the bars on one of the sectors, so that when the shaft is in the proper position five of the bars 61 of each series will be alined with the bars 58, which are alined with one pair of pole-pieces, thereby closing the magnetic circuit through that pair of pole-pieces. In the present construction there are six pairs of poles, and the stationary bars are arranged so that the movable bars coincide with the stationary bars alined with one pair of pole-pieces at a time. That is, when the bars are alined between one pair of pole-pieces, they are staggered between the diametrically opposite pair of pole-pieces and partly offset between the other four pairs of pole-pieces. As the shaft is rotated, therefore, the magnetic resistance between each pair of pole-pieces is successively increased and decreased causing a variation of the flux through said pole-pieces from minimum to maximum, and thereby generating an electromotive force in the winding surrounding the pole-pieces. The flux through each winding is unidirectional and varies from maximum to substantially zero. The flux varies in each pole-piece from maximum to zero, and back to maximum for a revolution of the shaft through an arc of one tooth pitch, or bar pitch, producing sixty-two variations of the flux in each coil for each revolution of the shaft. On account of the plurality of air gaps in the magnetic circuit when the bars are staggered, the resistance of the circuit at this point to magnetic leakage is very high, permitting the employment of a high magnetizing current, the presence of a strong current in the induced windings and a consequent large output.

The teeth 58 and 61 are preferably formed of laminations arranged on a central bolt, and on account of their radial position must be made smaller toward the center than toward the periphery. Properly the teeth should be tapered, but in order to obtain simplicity in manufacture, I have shown the teeth formed in steps of increasing width outward.

I claim:

1. In a dynamo electric machine, means for producing a magnetic flux, a stationary element and a rotatable element adapted to be traversed by said magnetic flux, and a plurality of relatively movable elements arranged between said stationary element and said rotatable element.

2. In a dynamo electric machine, means for producing a magnetic flux, means for modifying said magnetic flux, a stationary element and a rotatable element adapted to be traversed by said magnetic flux and a plurality of relatively movable bars arranged in the path of the magnetic flux and spaced from the stationary and rotatable elements adapted to vary the reluctance of the magnetic circuit at different portions of the machine.

3. In a dynamo electric machine, a magnetizing winding adapted to produce a magnetic flux, an armature winding adapted to modify said magnetic flux and a magnetic circuit adapted to be traversed by said flux, including a stationary element, a rotatable element and a plurality of relatively movable bars spaced from said elements and adapted by their relative movement to vary the resistance of the circuit at different portions thereof.

4. In a dynamo electric machine, a stator including circularly arranged elements spaced apart radially, a rotor including circularly arranged elements spaced apart radially and alternating with the stator elements, a winding on said stator and a magnetizing winding, said stator and rotor forming part of a magnetic circuit, the circularly arranged elements thereof being arranged to vary the reluctance of the magnetic circuit at different portions thereof.

5. In a dynamo electric machine, a stator including an annular element and a concentric series of spaced bars spaced radially from said element and separated magnetically therefrom.

6. In a dynamo electric machine, a magnetic circuit formed partly of a plurality of series of laminated bars, the bars of each series being spaced apart circumferentially, the bars in the alternate series being alined and stationary and the bars in the other series being alined and movable, the arrangement of the bars in the two sets of series being such that when some of the bars in all of the series are alined in one part of the machine, some of the bars in all of the series are staggered in another part of the machine.

7. In a dynamo electric machine, a magnetic circuit formed partly of a plurality of series of laminated bars, one of the series of bars being movable and one of the series of bars being stationary, the number of bars in one stationary series being different than the number of bars in one movable series, whereby movement of the movable series serves to vary the reluctance of the magnetic circuit differently at different portions of the machine.

8. In a dynamo electric machine, a rotatable element, a stationary element having induced windings thereon, a magnetizing winding adapted to produce a magnetic flux through said rotatable element and said stationary element, and a plurality of series of laminated bars arranged between said rotatable element and stationary element, said series of bars being relatively movable to vary the resistance offered to the passage of the magnetic flux through portions of the rotatable element and stationary element.

9. In a dynamo electric machine, a magnetic circuit, a magnetizing winding for producing a magnetic flux through said circuit, induced windings adapted to be traversed by said flux, and means forming a part of the magnetic circuit for varying the flux through said windings said means comprising a plurality of series of laminated bars, the successive series of said bars being relatively movable to vary the resistance of the circuit.

10. In a dynamo electric machine, a magnetic circuit formed partly of a series of stationary laminated bars and a series of movable laminated bars arranged adjacent the stationary bars, the bars in the stationary series being alined radially and being so arranged with relation to the movable bars, that when some of the bars of the stationary and movable series are radially alined in one portion of the machine, other stationary and movable bars are non-alined radially in another portion of the machine, a magnetizing winding for producing a magnetic flux through the magnetic circuit and induced windings adapted to be traversed by said flux.

11. A dynamo electric machine comprising two co-axial stationary elements, induced coils common to both stationary elements, a rotatable element concentric with each stationary element, a magnetizing winding associated with said rotatable elements and means comprising stationary and rotatable laminated bars for varying the reluctance of the magnetic circuit at a plurality of points between said stationary and rotatable elements.

12. A dynamo electric machine comprising two co-axial stationary elements, induced coils common to both stationary elements, a rotatable element having two circumferential faces arranged concentrically with said stationary elements, a magnetizing winding surrounding said rotatable element, a plurality of series of laminated bars arranged between said stationary elements and said rotatable element, the alternate series of bars being movable with respect to the others, the bars in the successive series being arranged so that when the bars are alined in one plane between one stationary element and one face of the rotatable element, they are alined in another plane between the other stationary element and the other rotatable element face.

13. In a dynamo electric machine, a uniformly toothed stationary element and a uniformly toothed rotatable element, the teeth on the two elements being spaced to form open and closed magnetic flux path sections, each closed section consisting of a plurality of consecutively fully and partly alined teeth and each open section consisting of a plurality of consecutive fully and partly non-alined teeth, induced windings surrounding said closed and open sections, and an energizing winding creating a magnetic flux traversing said sections and the windings thereon.

14. In a dynamo electric machine, two co-axial stationary elements spaced from each other, a rotatable element arranged concentrically of said stationary elements having two faces alined with and spaced apart from said stationary elements, a magnetizing winding surrounding said rotatable element, a plurality of circular series of bars concentric with said rotatable element arranged between the faces of the rotatable and the stationary elements, the alternate series of said bars being secured to said rotatable element, the remaining series of bars being attached to the stationary element, said bars being arranged with respect to each other in such manner that when the bars between one stationary element and rotatable element face are alined in one plane, the bars on the other side of the machine are non-alined in the same plane.

15. In a dynamo electric machine, two co-axial toothed stationary elements, induced coils on said stationary elements spanning a multiple of teeth and forming a plurality of poles, a rotatable element arranged concentrically with said stationary elements having a face associated with each stationary element, a magnetizing winding surrounding said rotatable element, a plurality of series of bars between the opposing faces of each stationary and rotatable element, the alternate series of bars being stationary and attached to the stationary element and the intermediate series of bars being attached to the rotatable element and being rotatable therewith, there being n-regularly spaced bars in each stationary series and $n \pm K$ regularly spaced bars in each rotatable series, K being one-half the number of poles in the machine.

16. In a dynamo electric machine, two co-axial uniformly toothed stationary elements, a rotatable element having two uniformly toothed circular faces arranged concentrically within said stationary elements, a magnetizing winding surrounding said rotatable element, the number of teeth on the stationary element differing from the number of teeth on the rotatable element so that as the rotatable element revolves the successive teeth on the rotatable element move into alinement with the successive teeth on the stationary element, and an induced winding arranged on said stationary elements, each coil of the winding spanning a plurality of teeth.

17. In a dynamo electric machine, a uniformly toothed stator, a distributed induced winding arranged on said stator, each coil of the winding spanning a plurality of teeth, a uniformly toothed rotor arranged concentrically with respect to said stator, the pitch of the teeth on the rotor being of a different number of degrees than the pitch of the teeth on the stator so that rotation of the rotor causes the point of maximum radial alinement between the stator and rotor teeth to progress at a higher angular velocity than said rotor.

18. In a dynamo electric machine, a stationary element having a distributed winding arranged thereon, the coils of each phase of the winding being arranged in groups spaced apart circumferentially, means for producing a magnetic flux traversing said winding, a rotatable element arranged within said stator, and means operative by the rotation of the inductor for varying the flux similarly through the alternate groups of each phase at a rate greater than the rate of rotation of the inductor.

19. In a dynamo electric machine, a toothed stationary element, a series of bars spaced radially from and alined with said toothed element, an induced winding on said stationary element a toothed rotatable element in operative relation with said stationary element, a series of bars spaced radially from said rotatable element radially alined with the teeth thereon, and disposed between the stationary element and the first series of bars, said series of bars and teeth spaced circumferentially so that a series of consecutive teeth and bars are fully and partly alined, forming a closed portion, and a series of consecutive teeth and bars are fully and partly non-alined, forming an open portion, each closed and each open portion forming a pole; said induced winding consisting of as many pole windings as there are closed and open portions around the circumference of one of the elements.

20. In a dynamo electric machine, an energizing coil producing a magnetic flux, a stator including a plurality of radially spaced bars and a winding arranged on its inner circumference, a rotor including a plurality of radially spaced bars interposed between the body of the stator and the bars thereon, the circumferential spacing of the two pluralities of bars being such that rotation of the rotor will cause the magnetic flux to traverse said rotor and to progress at a higher angular velocity than the rotor.

21. In a dynamo electric machine, a stationary element, a series of bars spaced radially from said stationary element and secured thereto, an induced winding on said stationary element, a rotatable element arranged in operative relation with said stationary element, a series of bars secured to and spaced radially from said rotatable element and lying between the stationary element and the first series of bars, said stationary element, rotatable element, and the series of bars forming part of a magnetic circuit, the bars being so spaced circumferentially that a plurality of consecutive bars are fully and partly alined, forming a closed portion, and a plurality of consecutive bars are fully and partly non-alined, forming an open portion, each closed and each open portion forming a pole; said induced winding consisting of as many pole windings as there are closed and open portions around the circumference of one of the elements.

22. In a dynamo electric machine, a stator having two co-axial toothed faces, a distributed winding arranged on said stator, a rotor having two co-axial toothed faces, each associated with a stator face, the teeth on each pair of associated faces being spaced so that when the teeth in one pair are alined in one plane, the teeth on the other pair are non-alined in the same plane.

23. In a dynamo electric machine, a magnetic circuit including a plurality of circular series of laminated bars, the bars in each series being movable with respect to the bars in an adjacent series, the bars in the plurality of series being arranged to be alined at one portion of the machine and non-alined at another portion.

24. In a dynamo electric machine, a stationary element, a series of bars spaced radially from said stationary element, an induced winding on said stationary element, and a series of rotatable bars arranged between said stationary element and said first series of bars; the bars in the two series being so arranged that they form a plurality of closed and open magnetic flux paths, which flux paths form as many poles and traverses as many pole windings as there are closed and open portions, each portion being composed of consecutive closed paths or consecutive open paths.

25. In a dynamo electric machine, a magnetizing winding producing a magnetic flux, a stationary element, induced coils on said element, a rotatable element arranged concentrically with and spaced from said stationary element, a plurality of series of relatively movable laminated bars arranged between said stationary and rotatable elements, said bars being arranged to produce a revolving flux traversing said coils, the angular velocity of said flux being greater than the angular velocity of the rotatable element, 26. In a dynamo electric machine, a magnetizing winding producing a magnetic flux, two co-axial stationary elements, induced coils engaging both elements a rotatable element having oppositely magnetized faces arranged concentrically with and spaced apart from said stationary elements, each face being associated with the respective stationary element, and a plurality of series of relatively movable magnetic bars arranged between each stationary element and the corresponding face of the rotatable element, said bars being arranged upon rotation of the rotatable element to produce a revolving magnetic flux of greater angular velocity than said rotatable element traversing said coils.

27. In a dynamo electric machine, a distributed induced winding, a magnetizing winding, a rotatable element arranged concentrically with said induced winding, and means arranged between said induced winding and said rotatable element serving to cause the rotation of said element to produce a gradually progressing revolving magnetic field of a higher angular velocity than said rotatable element traversing said winding.

28. In a dynamo electric machine, a distributed induced winding, a rotatable element arranged concentrically with respect to said winding and means operating in conjunction with said rotatable element for producing a gradually progressing revolving field of higher angular velocity than said rotatable element traversing said winding.

29. In a dynamo electric machine, a uniformly toothed stationary element and a uniformly toothed rotatable element, a series of circularly arranged stationary bars and a series of circularly arranged rotatable bars arranged between said elements with the stationary bars adjacent the rotatable element, the teeth and bars of the two elements and two series being spaced to form open and closed magnetic flux path sections, each closed section consisting of a plurality of consecutively fully and partly alined teeth and bars and each open section consisting of a plurality of consecutively fully and partly non-alined teeth and bars, induced windings surrounding said closed and open sections and an energizing winding creating a magnetic flux traversing said sections and the windings thereon.

In testimony whereof, I have hereunto set my hand at San Francisco, California, this 22nd day of August, 1913.

ALFONS H. NEULAND.

In presence of—
 H. G. PROST,
 M. LE CONTE.